Oct. 24, 1967 R. L. KOEPP ET AL 3,349,300

INTEGRATED FIELD-EFFECT DIFFERENTIAL AMPLIFIER

Filed Jan. 19, 1965 4 Sheets-Sheet 1

INVENTORS
Ronald L. Koepp
Dean C. Bailey

BY Mueller & Aichele

ATT'YS.

INTEGRATED FIELD-EFFECT DIFFERENTIAL AMPLIFIER

Filed Jan. 19, 1965 4 Sheets-Sheet 2

INVENTORS
Ronald L. Koepp
Dean C. Bailey
BY
Mueller & Aichele
ATT'YS.

INTEGRATED FIELD-EFFECT DIFFERENTIAL AMPLIFIER

Filed Jan. 19, 1965 4 Sheets-Sheet 3

INVENTORS
Ronald L. Koepp
Dean C. Bailey
BY
Mueller & Aichele
ATT'YS.

Oct. 24, 1967 R. L. KOEPP ET AL 3,349,300

INTEGRATED FIELD-EFFECT DIFFERENTIAL AMPLIFIER

Filed Jan. 19, 1965 4 Sheets-Sheet 4

INVENTORS
Ronald L. Koepp
Dean C. Bailey
BY Mueller & Aichele
ATT'YS.

United States Patent Office 3,349,300

Patented Oct. 24, 1967

3,349,300

INTEGRATED FIELD-EFFECT DIFFERENTIAL AMPLIFIER

Ronald L. Koepp, Creve Coeur, Mo., and Dean C. Bailey, Cupertino, Calif., assignors to Motorola, Inc., Franklin Park, Ill., a corporation of Illinois Filed Jan. 19, 1965, Ser. No. 426,545
7 Claims. (Cl. 317—235)

This invention relates to the semiconductor art and particularly to integrated circuit differential amplifiers.

A differential amplifier circuit constitutes a special class of circuits whose function is to amplify the difference between two signals rather than their individual values relative to some reference voltage such as ground potential. A differential amplifier circuit is characterized by having a substantially isolated pair of input leads; and the fact that they are isolated reduces input noise to such a low level that very weak signals may be amplified in the differential amplifier without their being swamped out or badly distorted. Each input or input lead in the pair controls an amplifying tube or transistor. Regulated current to operate the pair of tubes or transistors in the differential amplifier circuit is frequently provided by connecting the pair to a power supply through a constant current device. This constant current device acts to reject signals which are common to each input as, for example, noise generated in the power supply.

Interest in making biological measurements by electronic methods gave considerable impetus some years ago to the development of vacuum tube differential amplifiers, and more recently bipolar transistor differential amplifiers have assumed importance in telemetry applications where vacuum tubes are not suited due to their size and power requirements. There is considerable interest at present in integrated circuit bipolar transistor differential amplifiers for space and air telemetry equipment due to the considerable reductions in weight and size and power requirements. There is considerable inment is that used for collecting and communicating data from one point to another by remote control and for information and control purposes.

Integrated circuit differential amplifiers incorporating bipolar transistors as amplifying devices are not ideal. For example, in telemetry systems in the signal input providing the data at the remote point is extremely weak. Because the input impedance of bipolar transistors is low this results in a loss of signal strength. However, field effect transistors (FET's) have an extremely high input impedance, and there is substantially no loss in signal strength. As between bipolar transistors and FET's, the input impedance of FET's is several orders of magnitude greater, and the operation of a differential amplifier with the latter transistors is correspondingly that much better. With either type of transistor there must be close matching of the electrical characteristics in the pair, and in the past, such matching of FET's has been much more difficult than the matching of a pair of bipolar transistors.

In a monolithic integrated circuit, i.e., an integrated circuit constructed wholly on a single substrate of semiconductor material, used for a differential amplifier, two field effect transistors can be fabricated on the same semiconductor substrate at the same time under the same conditions. Therefore, it would seem that they should be very closely matched, and FET's appeared to be more desirable than bipolar transistors. This is not the case in practice, however, and actually it has not been possible in the past to readily and reproducibly make matched pairs of field effect transistors in an integrated circuit. Although FET's have the desirable electrical characteristic of high impedance, as previously mentioned, they have the undesirable characteristic of being extremely sensitive to differences in the dimensions and in the nature of certain key regions, which are all difficult to control in manufacture.

While most regions of an FET must be well controlled, the channel regions are especially critical. For example, the current that flows through the channel is very sensitive to variations in the thickness and the resistivity since it varies at least as the cube of the thickness of the channel and inversely as the square of the resistivity. As is well-known, the probability is that a wafer or a layer of semiconductor material will vary in structure and in physical and chemical composition at one point from the value of the same at another point, and this variation is greater when the distance between points is increased. Furthermore, it has not been possible with prior field effect transistors to place them closely together along corresponding portions and obtain consistently the desired degree of matching. In other words, it has been found in prior devices that the channel sensitivity previously mentioned has prevented consistent and acceptable matching of FET's in integrated circuits.

An object of this invention is to provide a method of manufacture and an improved structure for a matched pair of field effect transistors suitable for use in differential amplifiers.

A further object of our invention is to utilize the desirable characteristics of field effect transistors in a matched pair of the same.

In a field effect transistor, as above mentioned, the channel sensitivity is an important factor, and the channel connects the input region, or source, of the FET to the output region or drain.

A feature of this invention is the provision of a common input region or source for a pair of field effect transistors so that channel and adjacent regions are placed closely together, and by virtue of this a closely matched pair results.

Another feature of this invention resides in the method of making the field effect transistors in a pair so that the source, drain, gate and channel regions are almost identical for each field effect transistor.

Yet another feature of this invention is the provision of a differential amplifier device which includes in the same structure, a pair of matched field effect transistors having a common source region as amplifiers, and a bipolar transistor having a collector connected to the source region as a constant current source to provide a readily reproducible, highly effective single semiconductor device.

This invention embodied in a monolithic integrated device for use as a differential amplifier, and a method for making such device. The device includes as a unit on a semiconductor die a closely matched and structurally indivisible pair of field effect transistors. To provide a constant current for operation of such pair, a bipolar transistor is internally coupled to such pair of field effect transistors. The structure and method of manufacture are such that the electrical characteristics of the field effect transistors of the device are almost identical. These transistors are merged structurally to share a common source region, and this feature provides a minimal channel separation. The two channels lie in a common and highly uniform layer of semiconductor material.

Figure 1:
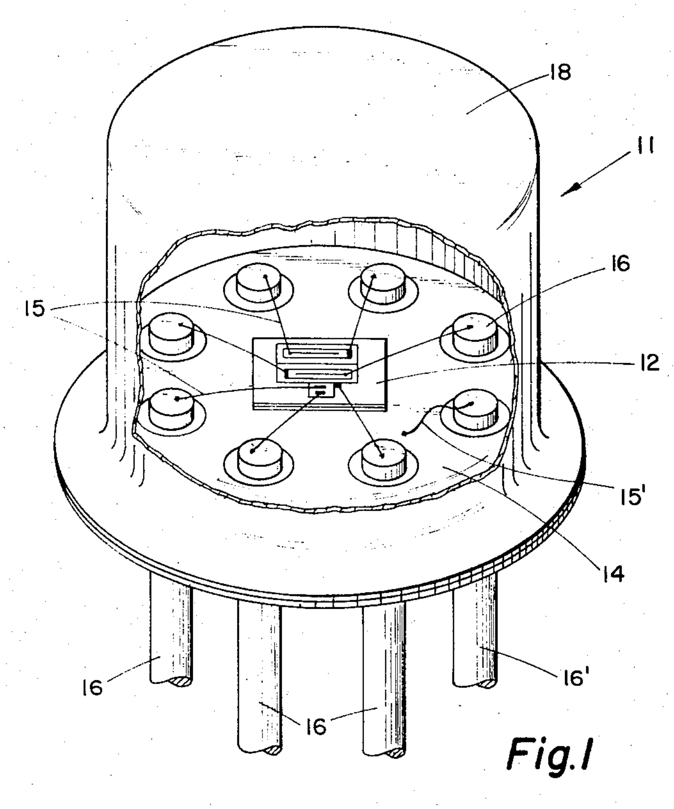
FIG. 1 is a cutaway view of a greatly enlarged differential amplifier semiconductor device consisting of a pair of matched field effect transistors and a bipolar transistor suitable for use as the active portion of a differential amplifier.
Figure 1A:
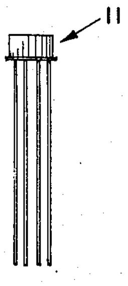
FIG. 1A is the device in actual size of one embodiment of the invention.

The semiconductor device 11 shown in FIG. 1 is an embodiment of this invention, and includes a pair of matched field effect transistors and a constant current bipolar transistor, all of which have been fabricated as an assembly on a single semiconductor unit 12. The device is shown 11 times actual size in cutaway in FIG. 1, and in actual size in FIG. 1A. In this embodiment, the semiconductor unit 12 is of silicon.

The semiconductor unit is bonded to the body of the header 14 and connection to the various terminals of the field effect transistors and the bipolar transistor on the semiconductor unit are provided by fine wires 15 thermo-compression bonded to these terminals and to the tops of the leads 16 of the header 14. One wire 15′ is bonded to the header body and the lead 16′ to provide connection to a common gate of the field effect transistors by way of the semiconductor unit 12. A hermetically sealed enclosure for the semiconductor assembly is provided by a metal cap 18 welded to the header.

Figure 2:
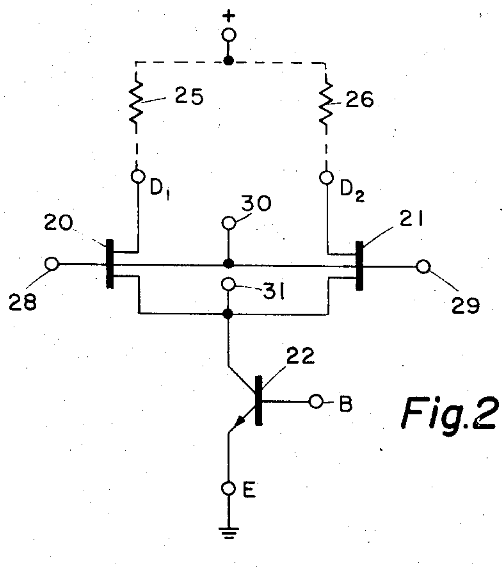
FIG. 2 is a circuit schematic of the device of FIG. 1.

FIG. 2 shows the circuit schematic diagram of a differential amplifier stage comprising two matched field effect transistors 20 and 21, the bipolar transistor 22 which serves as a constant current supply to them and the load resistors 25 and 26. This circuit diagram is made up of heavy solid lines and dashed lines. The heavy solid lines are the semiconductor device 11. As the complete amplifier stage circuit of FIG. 2 is comprised of just the device 11 and simple resistors 25 and 26, it can, if desired, be fabricated completely as a monolithic integrated circuit (FIG. 5) by forming these resistors on the semiconductor element 12 (FIG. 1). The floating input, characteristic of any differential amplifier stage, is provided in FIG. 1 by using the two gate connections 28 and 29 as the input. Typically, the input will be of a sufficiently high impedance so as to be well-suited to accurately measure signals in the order of a few microvolts, as only gate leakage current flows in the input. Since the gate connection 30 is common to both FET's 20 and 21, the gain of both FET's may be adjusted together by applying a reverse biasing voltage between the common gate connection 30 and the source connection 31. Increasing this bias, of course, allows the field effect transistors to be brought as closely to cutoff as desired, at which point the channel regions of the FET's become non-conductive.

Figure 3:
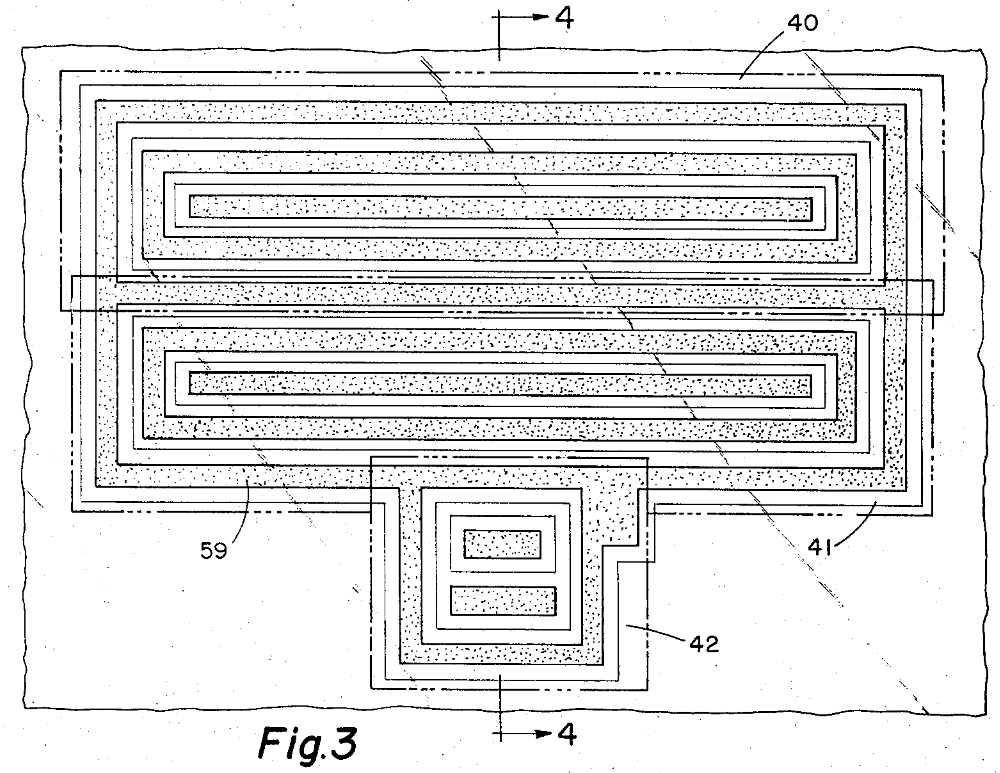
FIG. 3 is a greatly enlarged top view of a fragmentary portion of the semiconductor unit of the device with the transistors shown in full.
Figures 3A, 4:
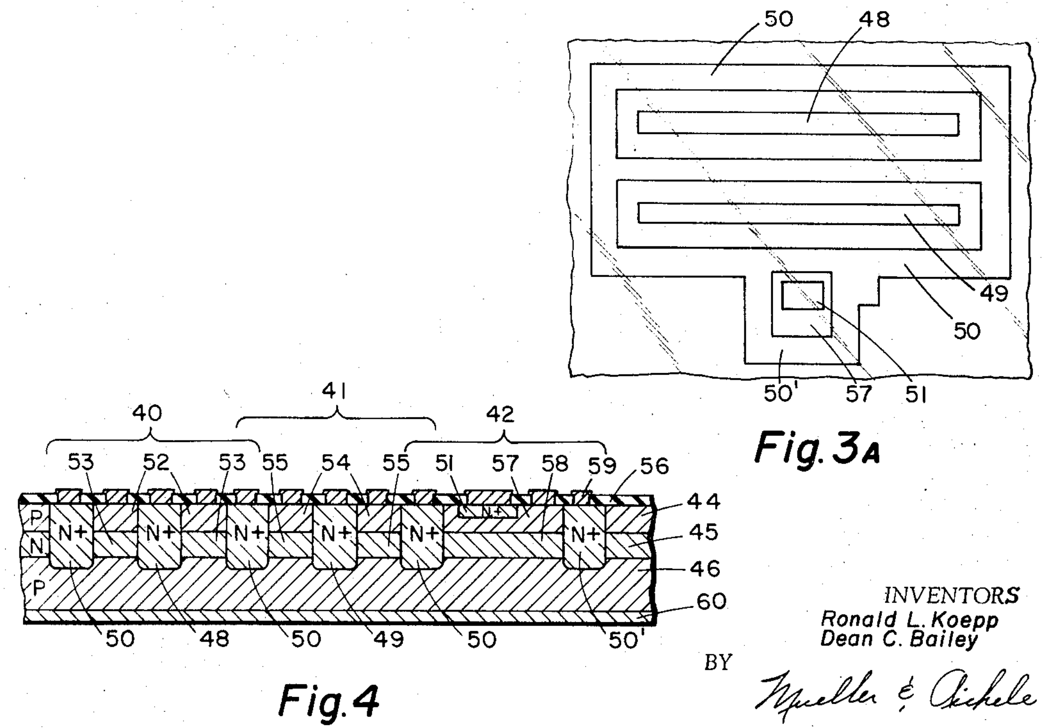
FIG. 3A is the same view as FIG. 3 but with metal contact regions removed to shown underlying regions.
FIG. 4 is a fragmentary cross sectional view through the device of FIG. 3 taken at line 4—4.

FIG. 3, the plan view of the semiconductor unit, FIG. 3A, the plan view with metallization removed, and FIG. 4, the cross sectional view taken at line 4—4 of FIG. 3, show that the two field effect transistors and the bipolar transistor are merged into a continuous single structure, but it is convenient for discussion to consider the transistors as discrete. Therefore, in FIG. 3 a dashed line box has been drawn about the bipolar transistor 42, and similar dashed line boxes have been drawn around the field effect devices 40 and 41. These same regions are shown beneath brackets in FIG. 4.

The semiconductor element 12 consists of P and N epitaxial layers 44 and 45 on a substrate 46 of P conductivity type material. The drain 48 of the first FET 40, the drain 49 of the second FET 41, the common source 50 for both FET's, the bipolar transistor collector connecting region 50′ and the N type diffused emitter 51 of the bipolar transistor 42 are all selectively diffused N type regions. The channels 53 and 55 in layer 44 and the P type upper gate regions 52 and 54 in layer 44 of the two FET's 40 and 41 are bounded by these N type regions. The lower gate is the substrate 46 and is common to the two FET's. The base 57 and collector 58 of the bipolar transistor 42 in layers 44 and 45, respectively, are defined by the source 50 and the collector connector 50′. PN junctions of all of these N regions with the P type epitaxial 44 layer have a passivating coating 56 of a silicon oxide such as silicon dioxide which protects the junctions and stabilizes their characteristics at the surface and reduces electrical leakage across them.

Connection to the various electrodes, i.e., source 50, drains 48 and 49, gates 52 and 54, emitter 51, collector connector 50′ is provided by the several aluminum films 59. The contact 60 to the lower gate is gold.

The structure and method of making the differential amplifier device are both simple and efficient as will be evident from the following.

The semiconductor units 12 are fabricated on silicon wafers in lots of over 100 units per wafer. In FIGS. 5A through FIG. 5I just enough of a wafer 61 is shown to illustrate the fabrication of a single semiconductor unit 12.

Figure 5A:
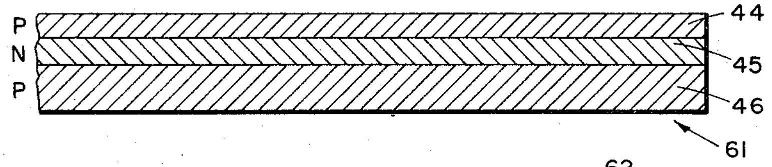
FIGS. 5A through 5I illustrate the results of various operations performed on a wafer of silicon in manufacturing the semiconductor unit of FIG. 3.

Two layers 44 and 45 of silicon semiconductor material are epitaxially grown on a 6 mil thick substrate 46 of half-ohm centimeter P type silicon to form a wafer as shown in FIG. 5A. The first epitaxial grown layer is 0.5 ohm-centimeter N type and is about 3.5 microns thick. The second epitaxial layer is 3 microns thick and is 0.5 ohm-centimeter P type.

Figure 5B:
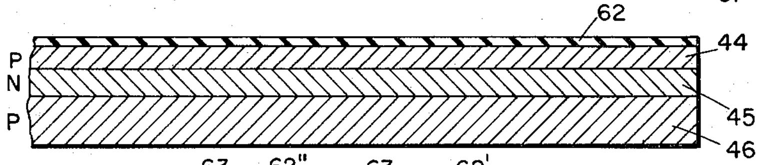

A film of silicon dioxide 62 about 7000 angstrom units thick is formed on the surface of the wafer as shown in FIG. 5B. The silicon dioxide will serve as a mask against diffusion of phosphorus into the silicon in a subsequent selective diffusion step.

Selective diffusion as used in this application, refers to the well-known solid state diffusion method in which diffusants are permitted to diffuse into certain selected regions of a wafer of semiconductor material but not into other regions. These "other regions" are protected against diffusion by a covering or mask, such as silicon dioxide, which is not readily penetrated by certain diffusants.

Figure 5C:
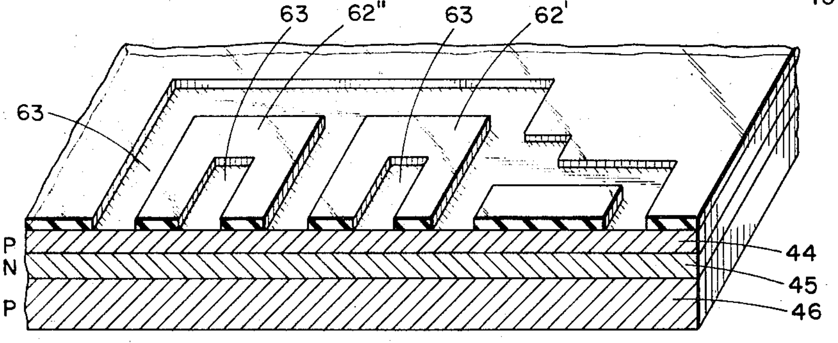

In preparation for the phosphorus diffusion step, a pattern of open areas 63 as shown in FIG. 5C is etched from the silicon dioxide 62 corresponding to the desired geometrical arrangement of the source and drain regions of the two field effect transistors and the base defining region. Photolithographic etching methods well-known to the semiconductor industry are used to form these and other openings as required in subsequent steps. These methods which are used throughout the process permit etching these openings and allow the device geometry to be established in an extremely accurate manner.

Figure 5D:
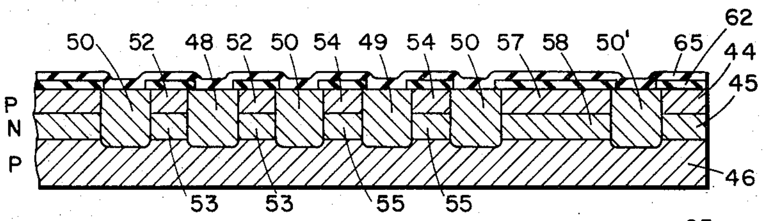

The wafer 61 is then diffused at the unmasked or open areas 63 with phosphorus to form the source 50, and drain regions 48 and 49 of the field effect transistors and the base defining collector contact region 50′ as shown in FIG. 5D. The surface concentration of phosphorus in those regions is about $2\times10^{21}$ atoms per cubic centimeter and a junction is formed with the 0.5 ohm-centimeter P type substrate at a depth of 7 microns. It should be noted that it is not essential to form these regions to this depth as they only need to make good connection with the layer 45 (FIG. 5A). The resistance of the source and drain is decreased somewhat by having them fairly deep, however, the gate capacitance is greater by a slight amount. The N regions formed in this diffusion are of the same width which is 1.5 mils. The two drains 48 and 49 are 25 mils long. The channels 53 and 55 and the gate regions 52 and 54 are also defined by this diffusion and they are uniformly 1.5 mils wide between the source and drains.

The base region 57 of the bipolar transistor defined by this diffusion step is 5 mils square at the surface. During the diffusion step a film 65 of phosphosilicate glass forms to a thickness of about 1000 angstrom units.

Figures 5E, 5F:
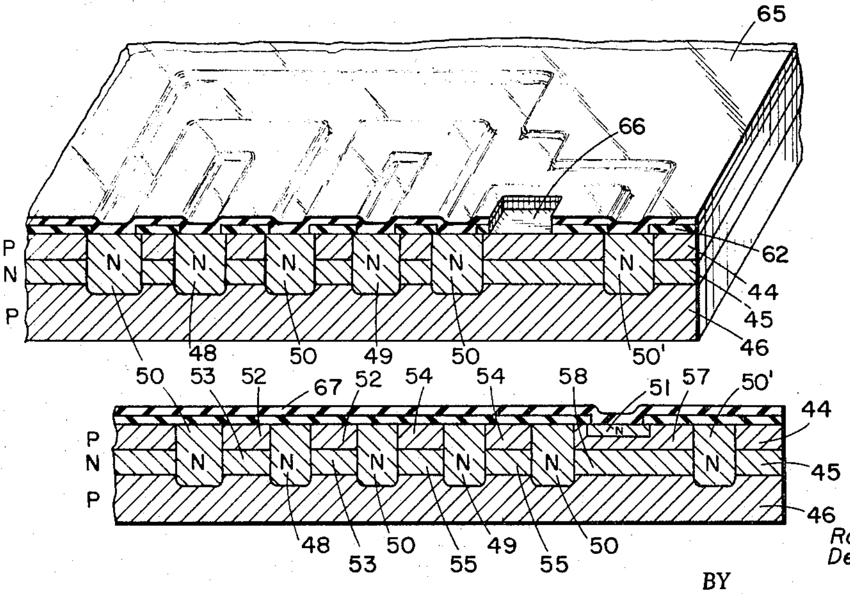

An opening 66 for the subsequent selective diffusion for forming the emitter is next etched into the glass film 65 using photolithographic etching procedures and silicon dioxide 62 as shown in FIG. 5E.

Phosphorus is diffused through the opening 66 to form N type emitter region 51 (FIG. 5F). This region has a phosphorus surface concentration of $10^{21}$ atoms per cubic centimeter, forms a PN junction with the base region at a depth of 1.5 microns, and is 4 mils long by 2 mils wide.

Figures 5G, 5H, 5I:
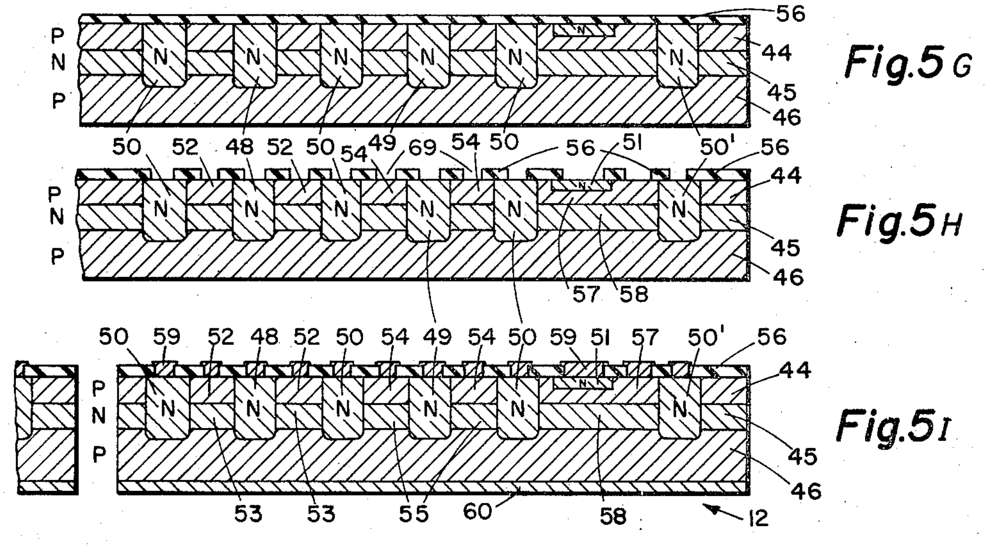

During the diffusion step the emitter opening is covered by a film of phosphosilicate glass 67 about 1000 microns thick. The silicon dioxide film and the phosphosilicate glass may be left covering the PN junctions for passivation purposes or alternatively, they may be stripped away and a fresh silicon dioxide film of about 5000 angstrom units in thickness formed, also for passivation purposes. A fresh oxide film 56 is shown in FIG. 5G. In either case the subsequent processing steps are identical.

Opening 69 (FIG. 5H) are etched using photolithographic methods in the passivating film 56 of oxide in preparation for a metallization step to follow.

Aluminum films 59 (FIG. 5I) are formed at the openings to provide the several contacts to the source 50, drains 48 and 49, the upper gates 52 and 54 of the field effect transistors, and to the collector 50', emitter 51 and base 57 of the bipolar transistor. These films are formed by vacuum depositing aluminum over the surface of the wafer and then using photolithographic etching methods, they are etched into the shape shown. Except that different etches are used, the method is the same as that used to form openings in the silicon dioxide. Gold is vacuum deposited on the bottom of the wafer to provide the contact 60 to the lower gates and to facilitate soldering of the wafer to the header subsequently. The wafer is then cut into discrete semiconductor units which are soldered to the header and connected to the lead by the fine aluminum wires which are thermocompression bonded to the contacts on the semiconductor unit. A can is welded to the header to complete the assembly.

Figure 6:
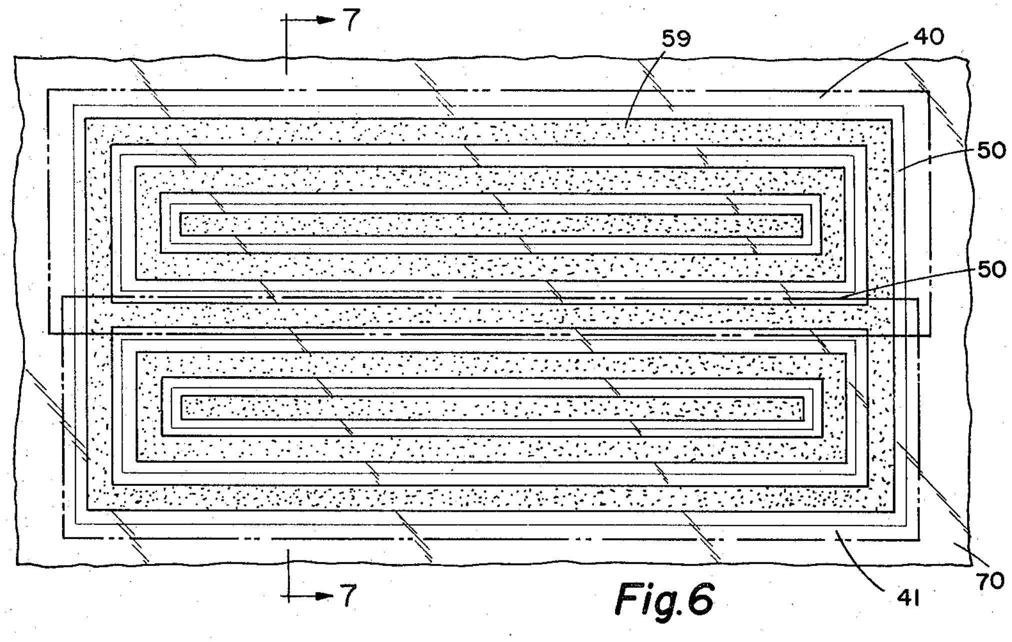
FIG. 6 is a top fragmentary view of an alternate semiconductor unit without the bipolar transistor.
Figure 7:
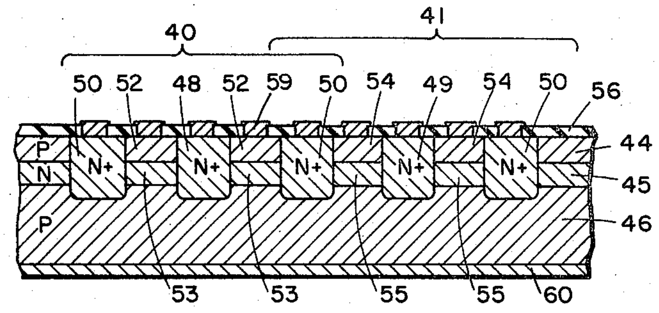
FIG. 7 is a fragmentary cross sectional view of the semiconductor element of FIG. 6 taken along the line 7—7.

It should be understood that in special circumstances the thickness and resistivity requirements for the channels of the FET's may be incompatible with those of the collector region of the bipolar transistor. In this case, a separate bipolar transistor, or some other constant current source may be fabricated elsewhere on the semiconductor unit 70, or it may be assembled elsewhere on the header 14 and connected by wires to the FET's. In the latter case the field effect transistor portions of the device would appear as shown in plan view of FIG. 6 and in section in FIG. 7. The preparation of the semiconductor unit 70 is substantially as described previously for preparing the semiconductor unit 12 of FIGS. 3 and 4, except that masks are prepared without the bipolar transistor portion 42 (FIG. 3), and the special steps required for making the bipolar transistor 42 are omitted. The numbering of the various parts of the merged field effect transistors of FIG. 6 and FIG. 7 is the same as for FIG. 3 and FIG. 4, because this portion of the device is identical.

Many advantages are derived by making the differential amplifier device of the present invention, or matched and coupled FET's according to this invention. Point to point variations in the thickness, dislocation density, resistivity and lifetime of layers of semiconductor material such as the epitaxial layers 44 and 45 (FIG. 5A) are usually gradual but may be considerable especially if the distance between points is large. These variations, however, are usually negligibly small for points very close to each other. The most critical regions of a field effect transistor are its channel and the gates on either side which partially define it, since small variations in resistivity and channel size will lead to rather severe variations in pinchoff voltage and current flow though the device. Pinchoff current flow in the channel of an FET is most sensitive and as previously mentioned, will be found to vary at least as the cube of the thickness and inversely as the square of the resistivity of the channel. Because the geometry of the two FET's 40 and 41 was defined by accurate photolithographic methods, in the plane of the wafer, the geometry of each FET 40 and 41 is almost identical. With regard to thickness, it is relatively easy at the present state-of-the-art to grow epitaxial films which vary per inch in length of less than 3000 angstrom units in thickness and less than ±10% of the resistivities specified. The separation between furthest points on channels and gates of the two transistors is only about 25 mils which would represent a variation in thickness of less than 150 angstrom units and a maximum variation in resistivity of less than 0.5%. The separation between near points on the channels and gates is less than 2 mils and, of course, the variation in thickness and resistivity is proportionally smaller. These variations on the average are so small as to be practically negligible and, therefore, it is not at all difficult using the methods described to obtain well-matched FET pairs or excellent differential amplifier devices.

We claim:

1. A semiconductor structure, including in combination, a layered body of relatively thick P-type semiconductor material, a first layer formed of N-type semiconductor material formed on said body and having a thickness less than said body, a second layer formed of P-type semiconductor material and disposed on said first layer and having a thickness less than said body, a first region of N+ type semiconductive material formed through said layers and extending into said body and forming three separate and isolated enclosed areas extending through both of said layers which are isolated and circumscribed by such N+ region, second and third regions of N+ type semiconductor material formed within two of said enclosed areas and extending into said body through both layers, and a fourth region of N+ semiconductive material formed in said second layer and lying within a third enclosed area, and independent electrical connections to said second layer at said enclosed areas, to said N+ regions and to said body.

2. A semiconductor structure for providing a pair of similar type FET transistors, including in combination, a body of first conductivity type semiconductor material, a layer of second conductivity type semiconductor material disposed on said body, a layer of said first conductivity type material disposed on said second conductivity type layer remote from said body, a source region of heavily doped second conductivity type material shaped to extend through said layers to said body to form and circumscribe two areas in both of said layers electrically isolated from each other and from portions of said layers outside said source region, a pair of drain regions formed of heavily doped second conductivity type material extending through said layers to said body respectively in said isolated areas and separated from said source region by portions of said layers between said regions, and independent electrical connections to said regions and to said first conductivity type layer areas such that portions of said second conductivity type layer formed by said regions and respectively extending between each drain region and said source region acts as a current conducting channel controllable by said first conductivity type layer and said body.

3. The structure in claim 2 wherein said source region forms third ring enclosing a third area in said layers electrically isolated from other portions or areas of said layers, an emitter region of heavily doped second conductivity type material formed in said first conductivity type layer in said third area, and independent electrical connections to said emitter region and said third area of said first conductivity type layer.

4. The structure of claim 3 wherein said first conductivity type material is P type and said second conductivity type material is N type.

5. The structure of claim 3 wherein said source region encloses relatively elongated rectangular areas in said layers wherein said drain regions are formed as strips extending through said layers along the length of such rectangles and said third area is approximately a square.

6. A field effect semiconductor structure for use in a differential amplifier, including in combination, a first layer of first conductivity type semiconductor material, a second layer of second conductivity type semiconductor material formed on said first layer, a source region of first conductivity type material formed as a pair of closed rings and extending through both said layers forming a pair of isolated areas in said layers extending through both said layers, a pair of drain regions formed of said first conductivity type material respectively in said isolated areas and extending through both layers in spaced relation to said source region, and said regions having a higher conductivity than said layers.

7. The combination of claim 6 wherein said source region forms a third closed ring forming a third isolated area extending through said layers, and a transistor region formed in one of said layers having an opposite conductivity type and a lower conductivity than material in said one layer.

References Cited

UNITED STATES PATENTS

| | | | |
|---|---|---|---|
| 3,183,128 | 5/1965 | Leistiko et al. | 148—186 |
| 3,223,904 | 12/1965 | Warner et al. | 317—235 |

JOHN W. HUCKERT, *Primary Examiner.*

R. F. SANDLER, *Assistant Examiner.*